A. H. WHITE.
NUT LOCK.
APPLICATION FILED DEC. 26, 1911.
1,037,384.
Patented Sept. 3, 1912.
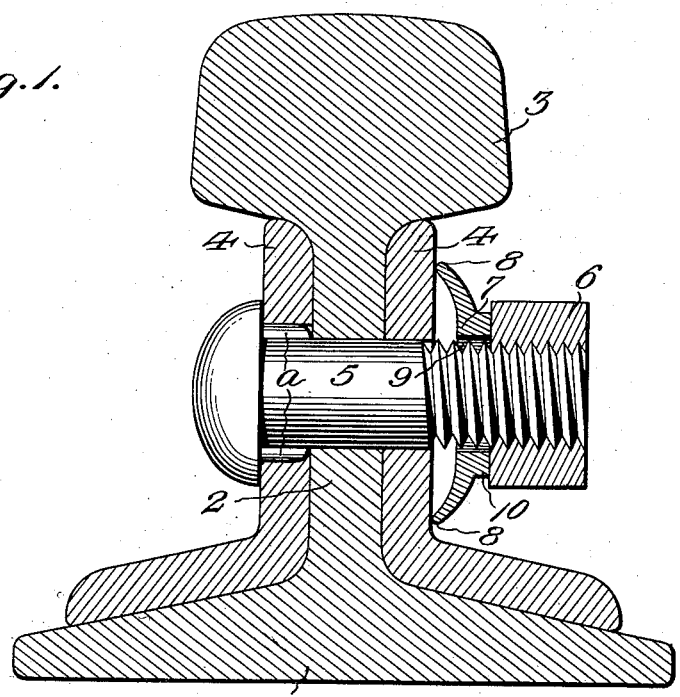
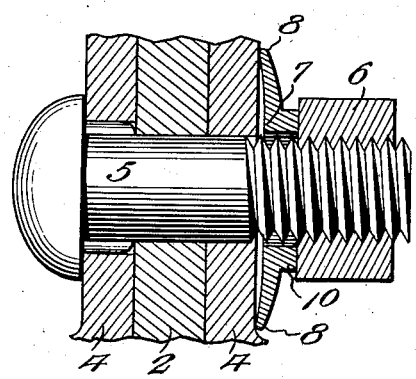
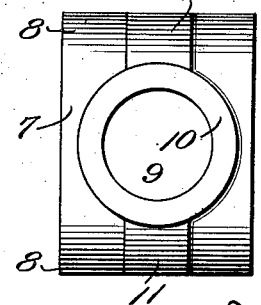
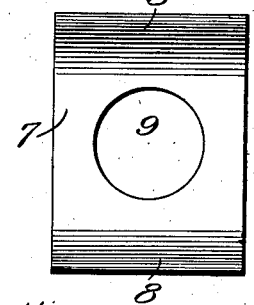
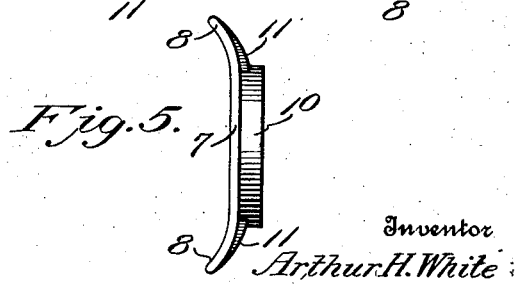
Witnesses
Edwin F. McKee
Annie J. Hind
Inventor
Arthur H. White
By Geo. W. Suto
Attorney

UNITED STATES PATENT OFFICE.

ARTHUR H. WHITE, OF NEW KENSINGTON, PENNSYLVANIA.

NUT-LOCK.

1,037,384.   Specification of Letters Patent.   Patented Sept. 3, 1912.

Application filed December 26, 1911. Serial No. 667,608.

*To all whom it may concern:*

Be it known that I, ARTHUR H. WHITE, a citizen of the United States, and a resident of New Kensington, in the county of Westmoreland and State of Pennsylvania, have invented certain new and useful Improvements in Nut-Locks, of which the following is a specification, reference being had to the accompanying drawings.

This invention has relation to certain new and useful improvements in locks employed to hold a nut against casual retrograde movement, the nut lock being especially adapted to be used in connection with bolts used to hold fish plates in place; and the object of my invention is to provide a device of this general character, of a simple and inexpensive nature and of a durable construction which shall serve as a washer and be capable of convenient and accurate adjustment in position upon a bolt to firmly hold the nut, so that manual manipulation will be required to unscrew the nut, the lock being capable of being repeatedly used.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, shows a transverse sectional view through a rail showing two fish plates as held in position by means of a suitable bolt, the bolt carrying a nut locking washer embodying my invention, the nut lock being shown in its normal condition before being compressed and distorted. Fig. 2, shows the bolt and nut with the locking means just before being finally seated. Fig. 3, is a top view of my nut lock. Fig. 4, is a bottom view. Fig. 5, is a side view.

In connecting the two ends of railroad rails, so-called fish plates are employed which are held to the ends of the rails by means of bolts and nuts. Owing to the movement of the bolt, nut and fish plates incidental to the car wheels pounding over the rail joints, the nut gradually unscrews, and in my present invention I provide an inexpensive positive means in the shape of a resilient washer arranged to hold the nut against accidental retrograde movement.

In the drawings, the numeral 1 designates the base, 2 the web, and 3 the head of a rail of conventional construction having suitable bolt openings within one of which is shown an ordinary bolt 5. Held to the web 2 and upon the base 1 of the rail, are the usual fish plates 4. One of these fish plates has an opening with oppositely positioned kerfs arranged to receive the wings $a$, of the bolt 5, as shown in Fig. 1, and which prevent the bolt 5 from rotating. This is a common expedient and forms no part of my invention. Threading upon the bolt 5 is the nut 6, and interposed between the nut 6 and the adjacent fish plate 4 is a nut lock constructed according to my invention.

My nut lock comprises a flat rectangular plate 7 of resilient material, preferably oblong, and having a centrally positioned bolt aperture 9, which upon what forms the outer face of the nut lock is surrounded by the annular flat faced flange 10. The plate 7 has its two opposite ends 8 rounded and at points beyond the flange 10 curved in a direction away from the flange 10, this construction being shown clearly in Fig. 5.

As shown in Fig. 3, a flat centrally positioned rib 11 extends over the curved portion of each washer. As shown in Fig. 5, these ribs 11 are attenuated toward the outer ends 8 of the plate. That is, the ribs 11 gradually increase in thickness from the ends 8 toward the flange 10. As shown in Fig. 5, the ribs 11 are of a thickness less than the thickness of the flange 10 at the point of union with the flange, and as shown in Fig. 3, are of a width less than the diameter of the annular flange 10.

The aperture 9 is of a diameter larger than the diameter of the bolt 5. This construction insures the annular flange 10 being held eccentric to the bolt 5.

The bolt 7 is of a predetermined thickness and strength so that after the nut 6 is firmly seated upon the washer, the plate 7 will be held in a strained or distorted condition. In securing the nut 6, owing to the force required to compress the washer, the nut 6 shears over the eccentrically held annulus. Now, in order to remove the nut 6, manual manipulation will be required and the nut must be turned in a retrograde movement and shears in starting over the eccentric annular flange 10. It is of course understood that if the flange 10 were held concentric to the bolt 5, the flange 10 would grind into the nut within certain limits, but there would be no shearing movement of the nut 6 upon the annular flange 10. However, in securing my nut locking spring washer, the same of course is held upon the bolt 5 and as the opening 9 is greater than the diameter of the bolt 5, the flange 10 is eccentrically held relative to the axis of the bolt 5. This is an important feature of my invention.

The nut lock above described may be formed entire at one operation, being stamped from suitable metal.

No jarring of the rail, fish plates, bolt or nut is sufficient to cause the nut 6 to accidentally rotate backward.

The nut lock is simple and inexpensive in construction, can be repeatedly used, is both durable and efficient in operation, and can be placed upon or removed from the bolt with ease, accuracy and despatch, in a manner absolutely insuring the nut being held to its bolt against accidental displacement.

Having thus described my said invention, what I claim as new and desire to secure by United States Letters Patent is:

1. A nut locking washer comprising a flat rectangular plate of resilient material having a centrally positioned bolt aperture surrounded upon one side by an annular flat faced flange the plate having two opposite ends beyond said flange curved in a direction away from said annular flange, a flat centrally positioned rib extending from each curved end toward said flange and gradually increasing in thickness toward said flange, said ribs being of a width less than the diameter of said annular flange and of a thickness less than said flange at the point of union therewith.

2. A nut locking washer comprising a plate of resilient material having a bolt aperture said plate upon one side having a flat faced annular flange surrounding said aperture, two ribs extending from said flange in opposite directions, the ends of said plate being curved said ribs extending over the curved ends and gradually decreasing in thickness toward their outer ends.

In testimony whereof I affix my signature, in presence of two witnesses.

ARTHUR H. WHITE.

Witnesses:
JOHN A. STEEN,
ANDREW KELLEY.